(12) United States Patent
Martin

(10) Patent No.: US 7,963,571 B2
(45) Date of Patent: Jun. 21, 2011

(54) TUBING CONFIGURATION AND SEALING METHOD FOR HIGH PRESSURE TUBING ON HIGH PRESSURE FUEL SYSTEMS

(76) Inventor: Tiby J. M. Martin, Sarasota, FL (US)

( * ) Notice: Subject to any disclaimer, the term of this patent is extended or adjusted under 35 U.S.C. 154(b) by 0 days.

(21) Appl. No.: 12/366,122

(22) Filed: Feb. 5, 2009

(65) Prior Publication Data

US 2010/0019494 A1    Jan. 28, 2010

(30) Foreign Application Priority Data

Jul. 25, 2008   (EP) ..................... 08013399

(51) Int. Cl.
 *F16L 19/00*   (2006.01)
(52) U.S. Cl. ...................... 285/354; 285/353
(58) Field of Classification Search .................. 285/353, 285/354
See application file for complete search history.

(56) References Cited

U.S. PATENT DOCUMENTS

| 966,870 | A | * | 8/1910 | Stoddard | 285/354 |
|---|---|---|---|---|---|
| 2,780,483 | A | * | 2/1957 | Kessler | 285/332.3 |
| 4,540,205 | A | * | 9/1985 | Watanabe et al. | 285/354 |
| 5,169,182 | A | * | 12/1992 | Hashimoto | 285/353 |
| 5,829,796 | A | * | 11/1998 | Robinson | 285/353 |
| 6,463,909 | B2 | * | 10/2002 | Asada et al. | 285/133.4 |
| 6,609,502 | B1 | * | 8/2003 | Frank | 123/469 |
| 6,981,721 | B2 | * | 1/2006 | Karasawa | 285/353 |
| 6,988,748 | B2 | * | 1/2006 | Staniszewski et al. | 285/353 |
| 7,497,482 | B2 | * | 3/2009 | Sugiyama et al. | 285/353 |

* cited by examiner

*Primary Examiner* — David E Bochna
(74) *Attorney, Agent, or Firm* — Charles J. Prescott

(57) ABSTRACT

A high-pressure joint for sealing the high pressure at the tubing ends for a high-pressure fuel system on diesel and gasoline engines. One form of the invention of such a method is disclosed using a harder male fitting and a hard tube end and introducing a replaceable insert made out of a softer material of lower yield strength which will deform at both ends and seal the two mating harder components. This insert will be a throw away part to be replaced every time the system is serviced or repaired and the joint is broken. The cost for this insert is minimum and will reduce the fuel system service or repair cost saving money for the customer.

7 Claims, 13 Drawing Sheets

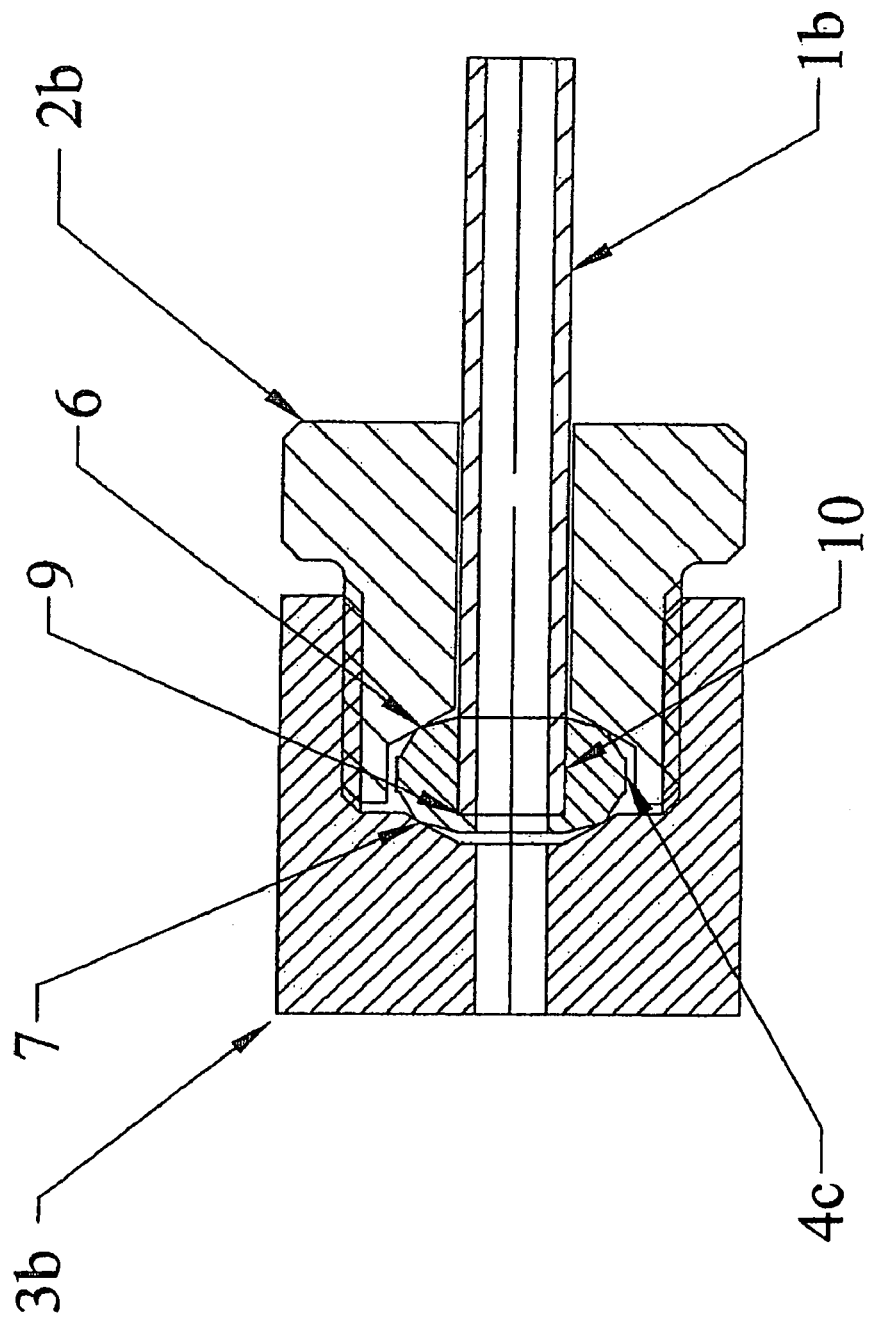

a b c d e f g h

US 7,963,571 B2

TUBING CONFIGURATION AND SEALING METHOD FOR HIGH PRESSURE TUBING ON HIGH PRESSURE FUEL SYSTEMS

STATEMENT REGARDING FEDERALLY SPONSORED RESEARCH OR DEVELOPMENT

Not applicable

CROSS-REFERENCE TO RELATED APPLICATIONS

This application claims the priority of European Patent Application No. 08013399.4, filed Jul. 25, 2008, which is hereby incorporated by reference.

INCORPORATION-BY-REFERENCE OF MATERIAL SUBMITTED ON A COMPACT DISC

Not applicable

BACKGROUND OF THE INVENTION

1. Field of the Invention

This invention relates generally to a new type of high-pressure tubing and a pressure sealing method to reduce service cost for high-pressure fuel injection systems service and repair on diesel and gasoline engines.

2. Description of Related Art

High pressure fuel injection systems on diesel and gasoline engines use high pressure tubing between the pump, rail and injectors. The sealing of the high pressure at the connecting joints at the tubing ends are metal-to-metal type using a fitting with a cone shaped angled surface as one of the mating parts and a differential angle, a flare or a ball shape mating end for the tubing end and a second mating part. One of the components made of a harder material (usually the fitting, the first mating part) and the second mating part, the tube end, has been made of a softer material to deform to the first part surface geometry during assembly torquing and sealing the fuel pressure inside the system at the joint points. The major problem with this method is that every time the joint is disassembled during service or repair, the tubing has to be replaced because the softer mating part is already deformed under the allowable torque, and the joint will not be able to re-seal the operating high pressure of the system.

The present invention is therefore directed toward providing a solution in the form of a new type of tubing and sealing method which will allow re-use of the high pressure tubing and reducing to a minimum the service cost for the high pressure fuel systems service and repair on diesel and gasoline engines.

The foregoing examples of the related art and limitations related therewith are intended to be illustrative and not exclusive. Other limitations of the related art will become apparent to those skilled in the art upon a reading of the specification and a study of the drawings.

BRIEF SUMMARY OF THE INVENTION

This invention is directed to using a new method of sealing the high pressure at the tubing ends for the high-pressure fuel system on diesel and gasoline engines. One form of the invention of such a method is disclosed comprising a method using a harder male fitting and a hard tube end and introducing an insert made out of a softer material which will deform at both ends and seal the two mating harder components. This insert will be a throwaway part to be replaced every time the system is serviced or repaired and the joint is broken. The cost for this insert is minimal and will reduce the fuel system service or repair cost, saving money for the customer. In another form of the invention a harder female fitting and a harder tube nut end with a softer insert therebetween are provided. Different embodiment designs are illustrated for these two options for the fitting and tubing nut.

The following embodiments and aspects thereof are described and illustrated in conjunction with systems, tools and methods which are meant to be exemplary and illustrative and not limiting in scope. In various embodiments one or more of the above-described problems have been reduced or eliminated while other embodiments are directed to other improvements. In addition to the exemplary aspects and embodiments described above, further aspects and embodiments will become apparent by reference to the drawings and by study of the following descriptions.

BRIEF DESCRIPTION OF THE SEVERAL VIEWS OF THE DRAWING(S)

FIGS. 3a and 3b illustrates a cross sectional view of the third embodiment showing a third design insert piece for the two fitting and tube nut options;

Figure 6:
Figure 6:
Figure 6:
Figure 6:
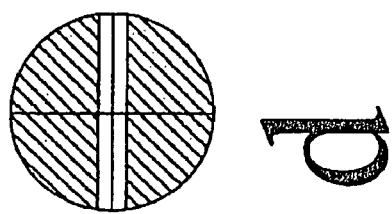
Figure 6:
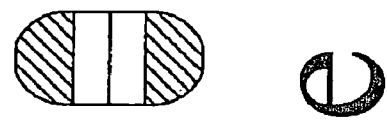
Figure 6:
Figure 6:
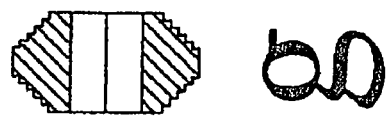
Figure 6:
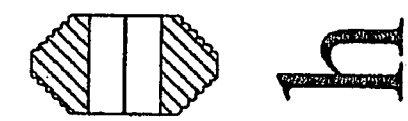

FIG. 6 illustrating different sectional shapes could be used for the insert, such as: flat (a), angled (b), multi-angled (c), round (d), curved (e), grooved (f), zigzagged (g) and polygon-grooved (h).

Figure 7A:
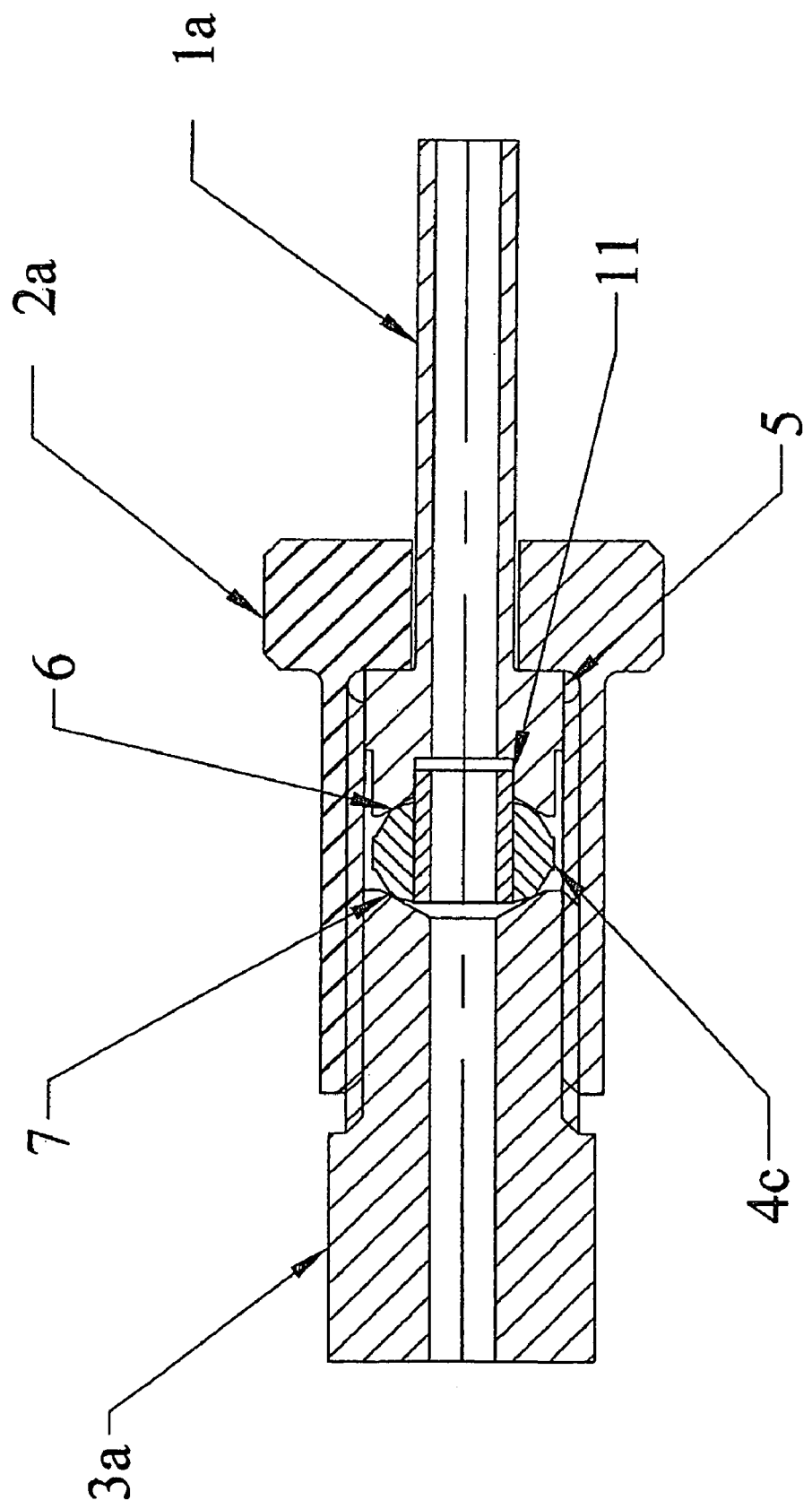
Figure 7B:
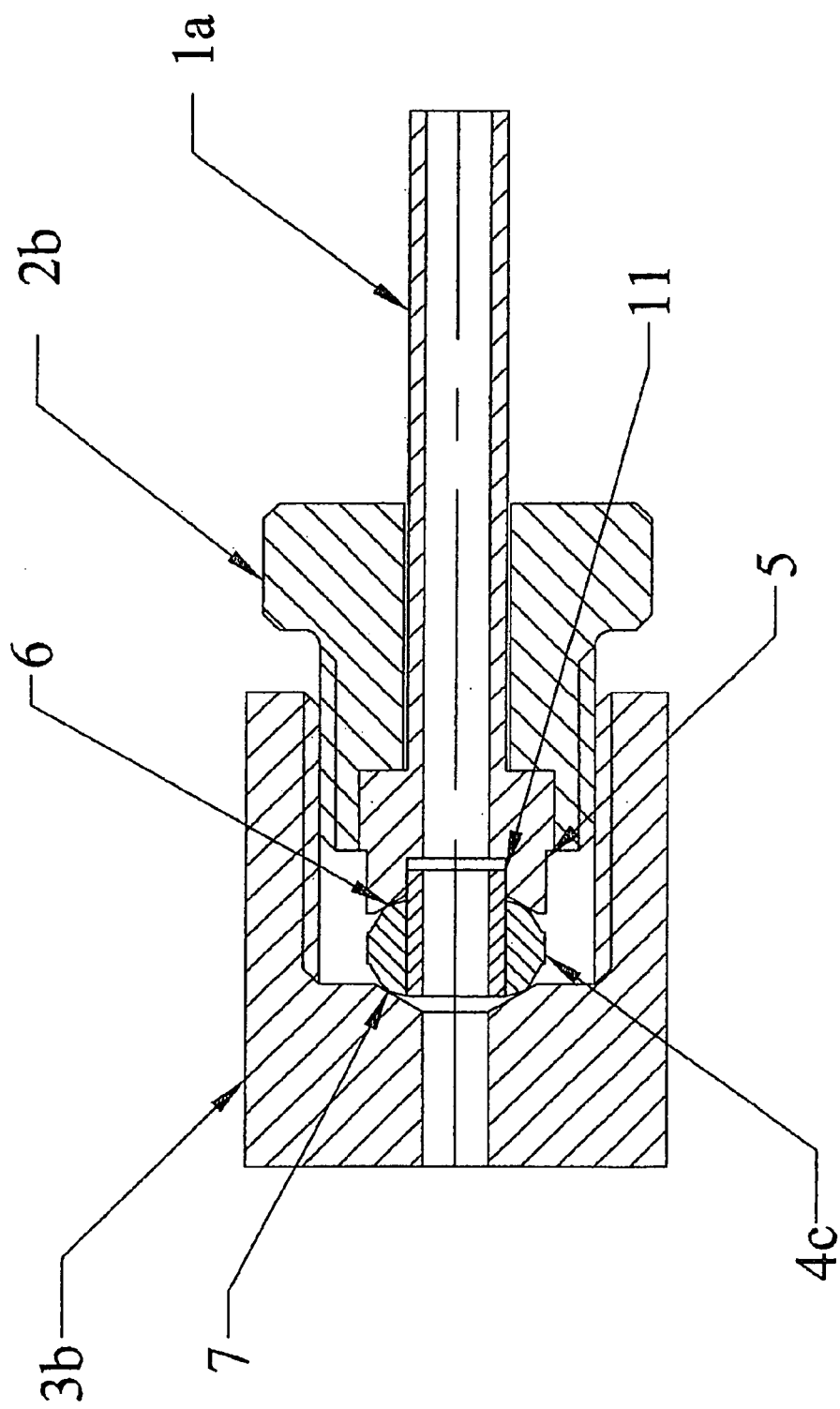

FIGS. 7a and 7b illustrate a cross-sectional view of the preferred embodiment showing the preferred deformable insert piece for the two fitting and tube nut options.

Exemplary embodiments are illustrated in reference figures of the drawings. It is intended that the embodiments and figures disclosed herein are to be considered to be illustrative rather than limiting.

DETAILED DESCRIPTION OF THE INVENTION

Figure 1A:
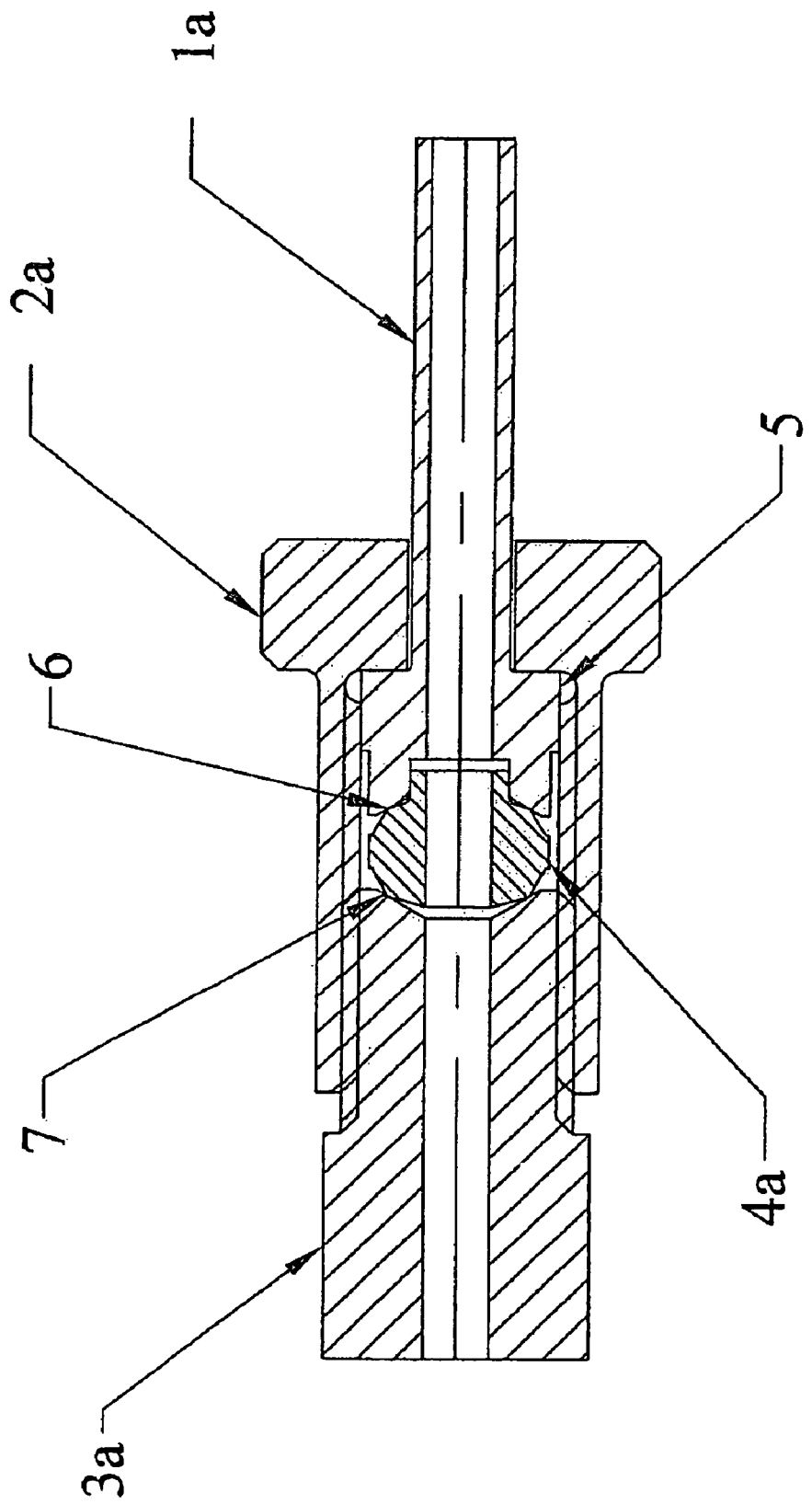
FIGS. 1a and 1b illustrate a cross sectional view of a first embodiment showing a first design deformable insert piece for the two fitting and tube nut options.
Figure 1B:
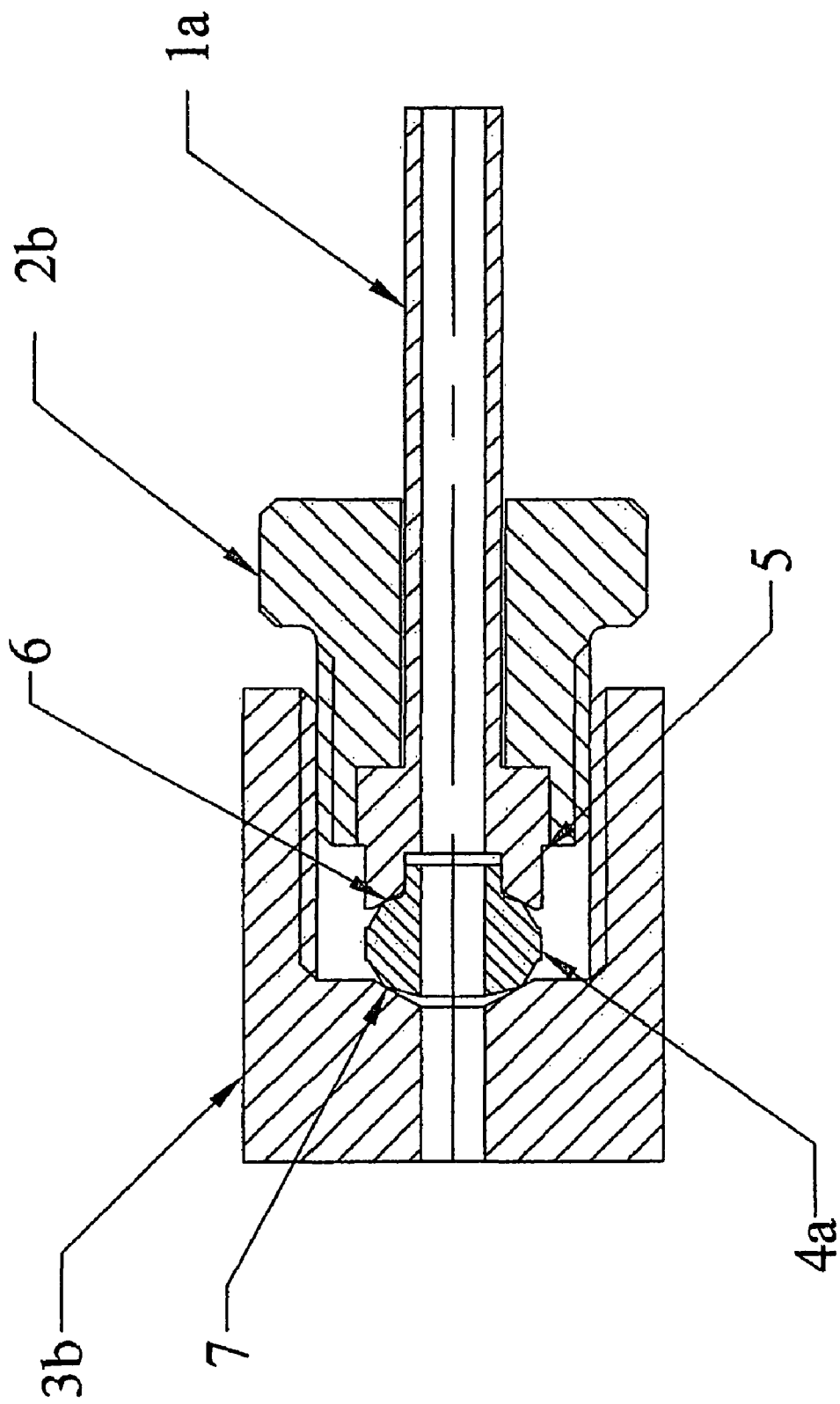

Referring to FIG. 1a, there is illustrated a first design insert piece (4a) inserted between a male fitting (3a) and, at the proximal end of tubing 1a, an enlarged female tube end (5) with a female nut (2a) threadably engaged over the threaded end of male fitting (3a). The insert piece (4a) will seal against the fitting (3a) on surface (7) and against the female tube end (5) on surface (6) by deforming during nut (2a) torquing process to retain the fuel pressure in the system (not shown). When the system is disassembled for service or repair, the insert piece (4a) will be discarded and replaced with a new one so as to have the same initial shape which will deform and seal again for the same nut torque. Referring to FIG. 1b, there is an illustration of a similar insert piece (4a) except that this option is applied to a female fitting (3b) and a female tube end (5) with a male nut (2b).

Figure 2A:
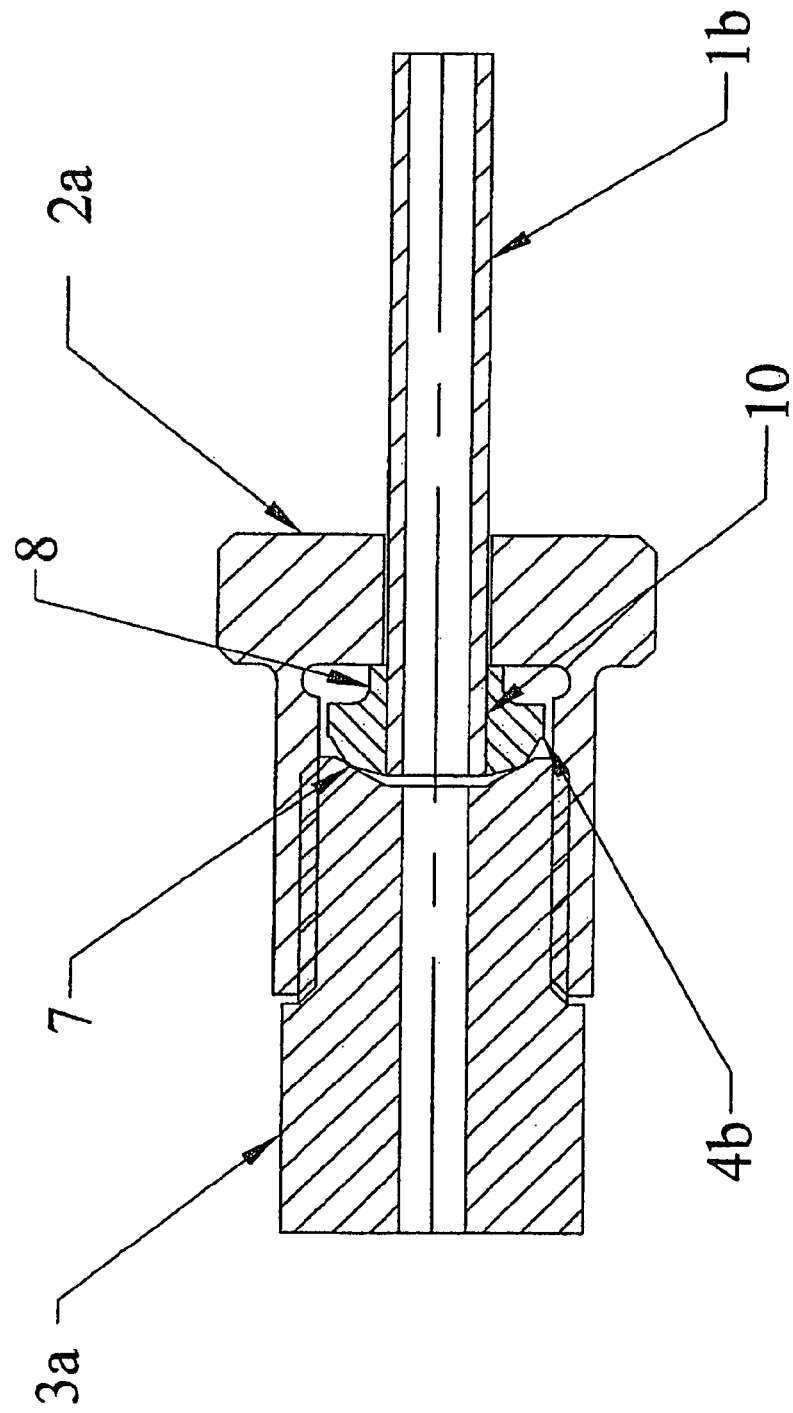
FIGS. 2a and 2b illustrates a cross sectional view of a second embodiment showing a second design insert piece for the two fitting and tube nut options.
Figure 2B:
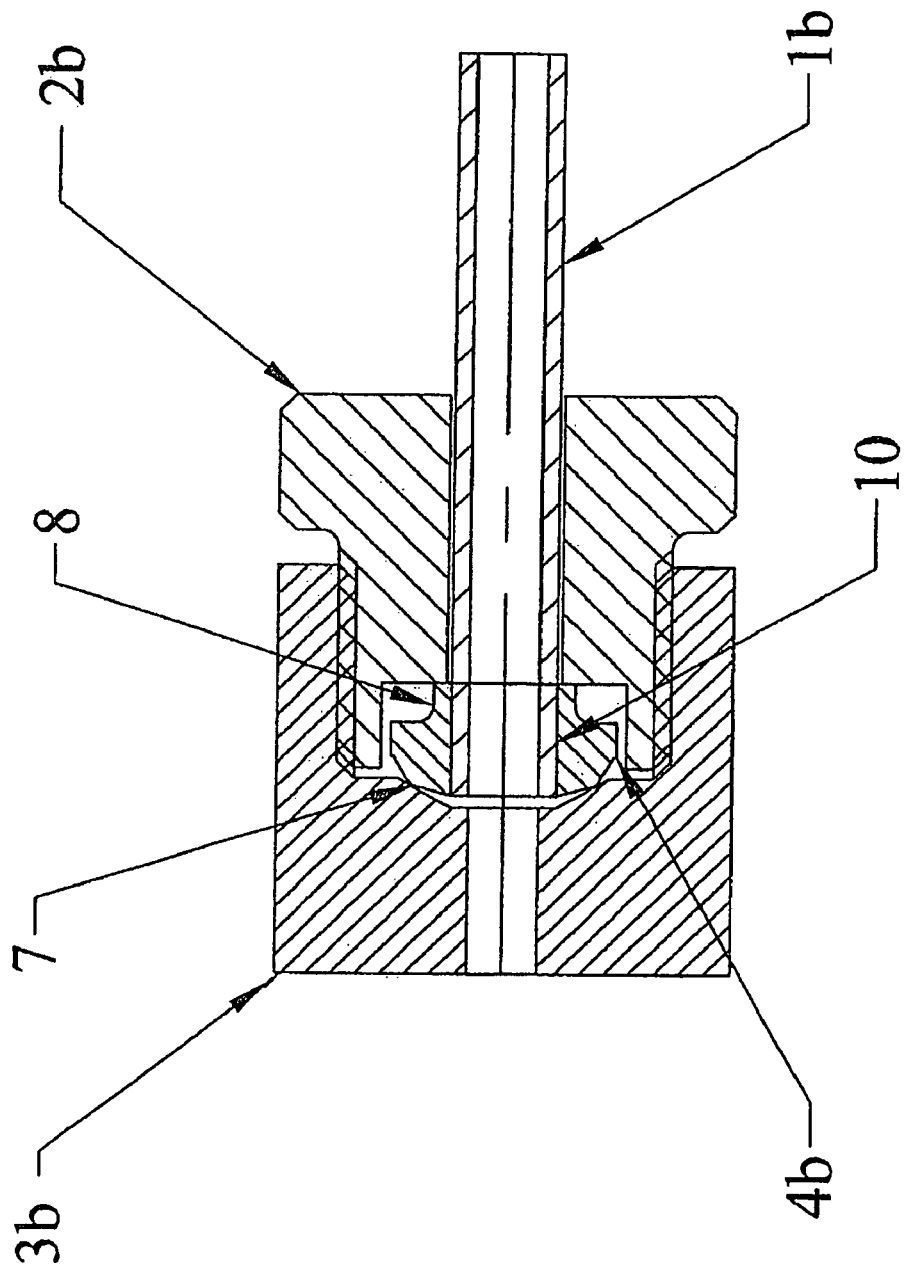

Referring to FIG. 2a, there is an illustration of a second design insert piece (4b) having a flange (8) on the nut side (2a) which been pressed or threaded to the standard tube (1b). The insert piece (4b) will seal on surface (7) only by deforming on that side during torquing. Referring to FIG. 2b, there is an illustration using the same insert piece (4b) in case of using the second option of female fitting (3b) and male nut.(2b).

Figure 3A:
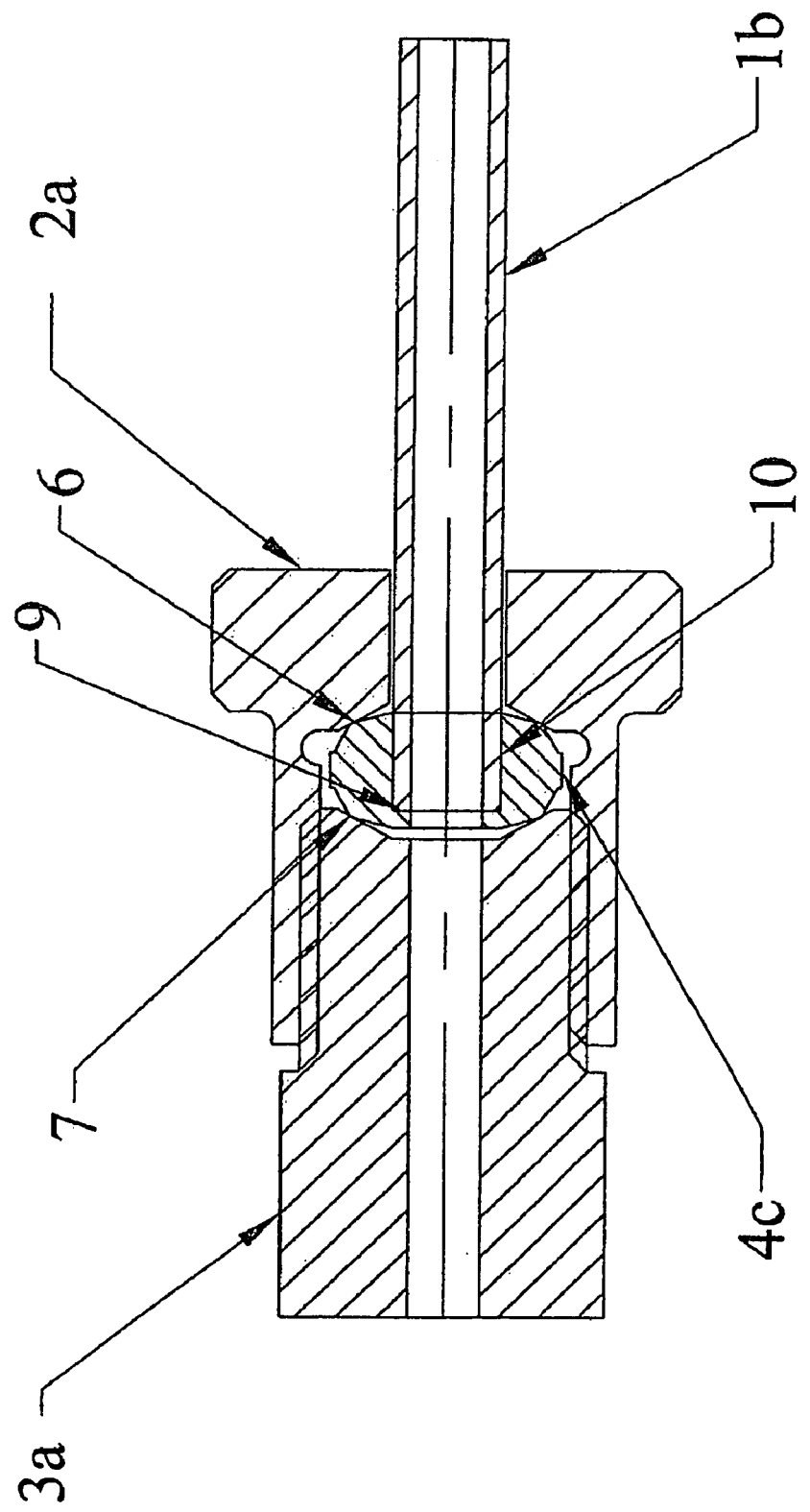

Referring to FIG. 3a, there is an illustration of a third insert piece design (4a) having an internal stop surface (9) to limit the slide of the insert piece (4c) on standard tube (1b) and to seal the male fitting (3a) on surface (7) and female nut (2a) on surface (6). Also during the nut (2a) torquing, the insert piece (4c) will deform and seal the tube (1b) on surface (10). Referring to FIG. 3b, there is an illustration of the same insert piece (4d) in case of using the second option of female fitting (3b) and male nut. (2b).

Figure 4A:
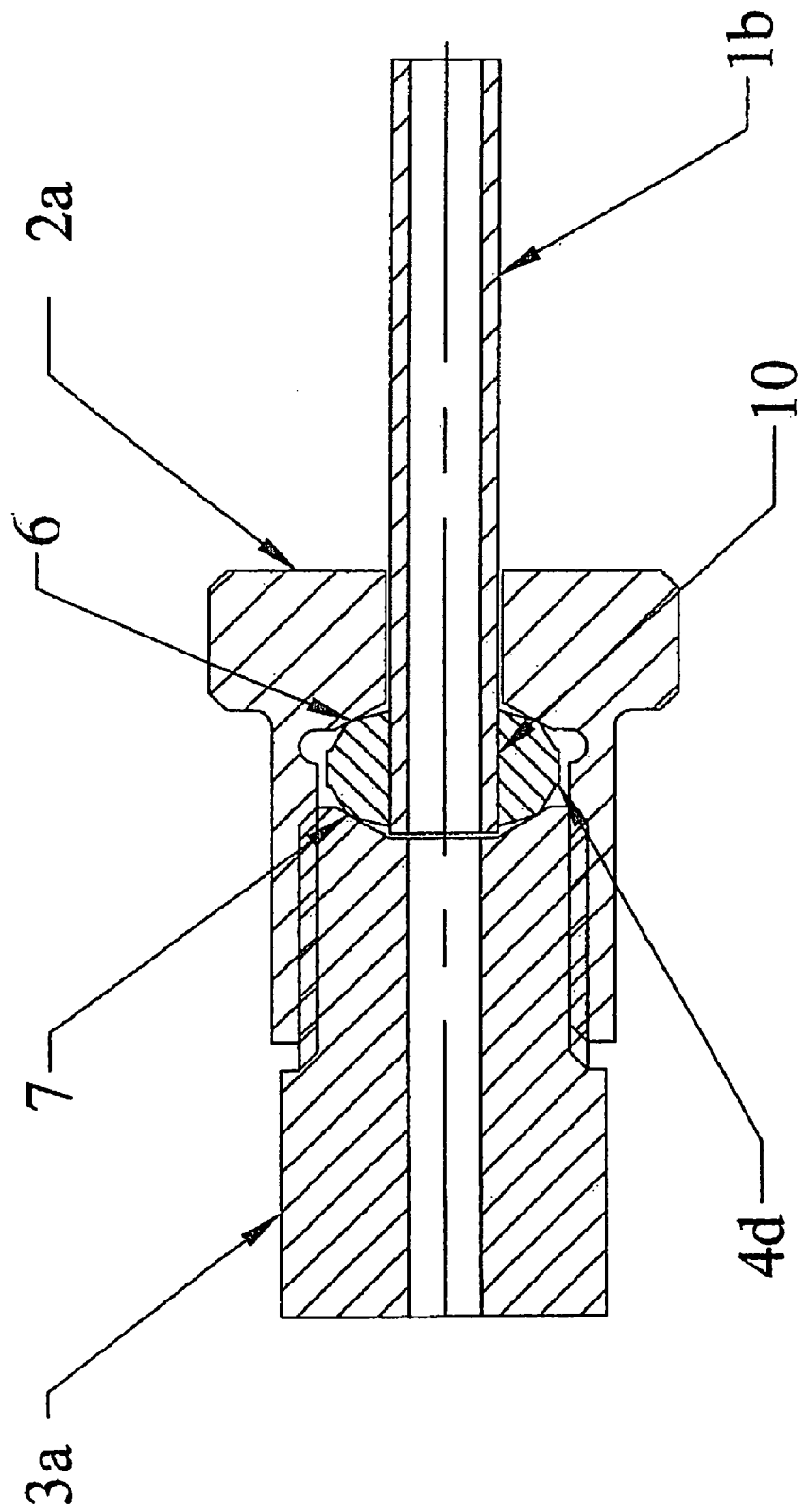
FIGS. 4a and 4b illustrates a cross sectional view of the fourth embodiment showing a fourth design insert piece for the two fitting and tube nut options.
Figure 4B:
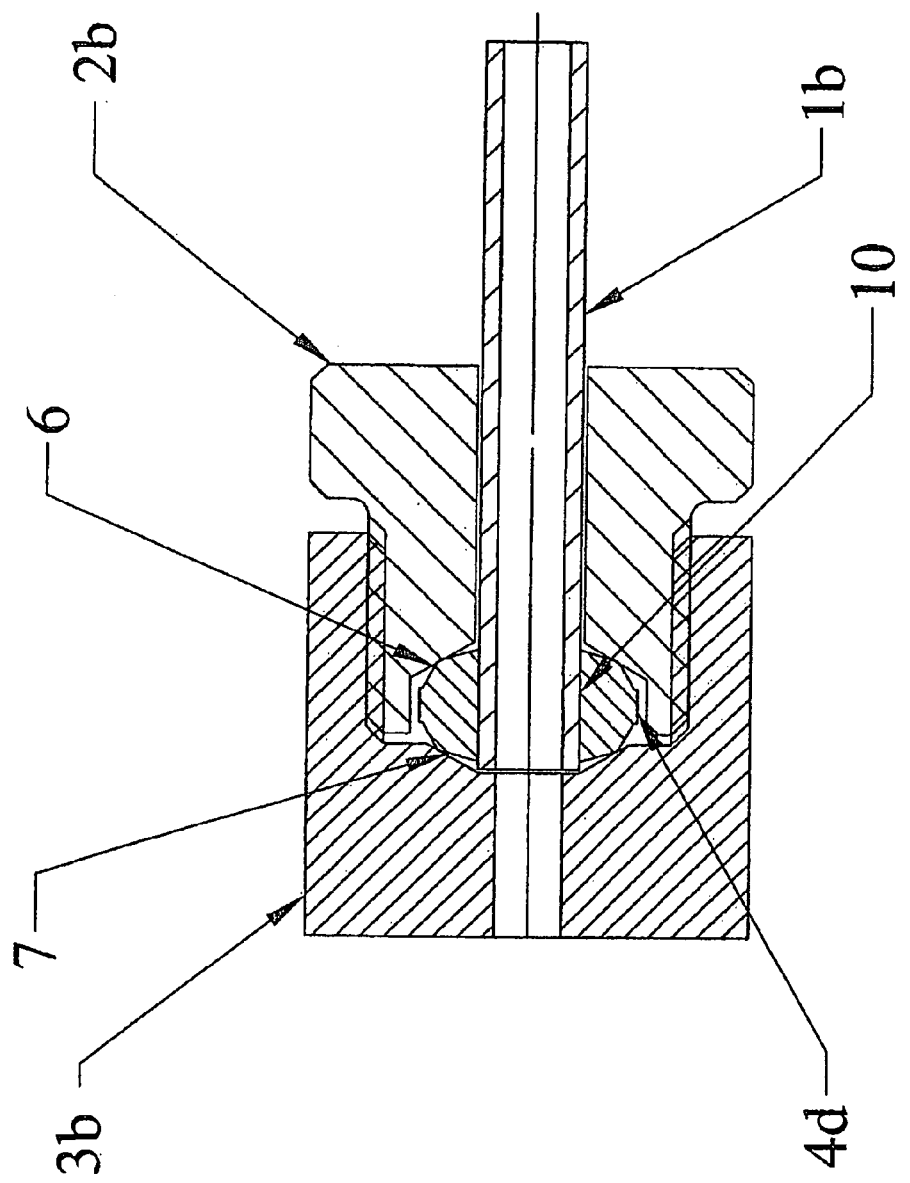

Referring to FIG. 4a, there is an illustration of a fourth insert piece design (4d) mounted on tube (1b) similar to the one illustrated in FIG. 3a but without an internal stop surface. The deformation of the insert piece (4d) on internal surface (10) will seal the insert piece (4d) to tube (1b) and stop the sliding during torquing. Referring to FIG. 4b, there is an illustration of the same insert piece (4d) in case of using the second option of female fitting (3b) and male nut.(2b).

Figure 5A:
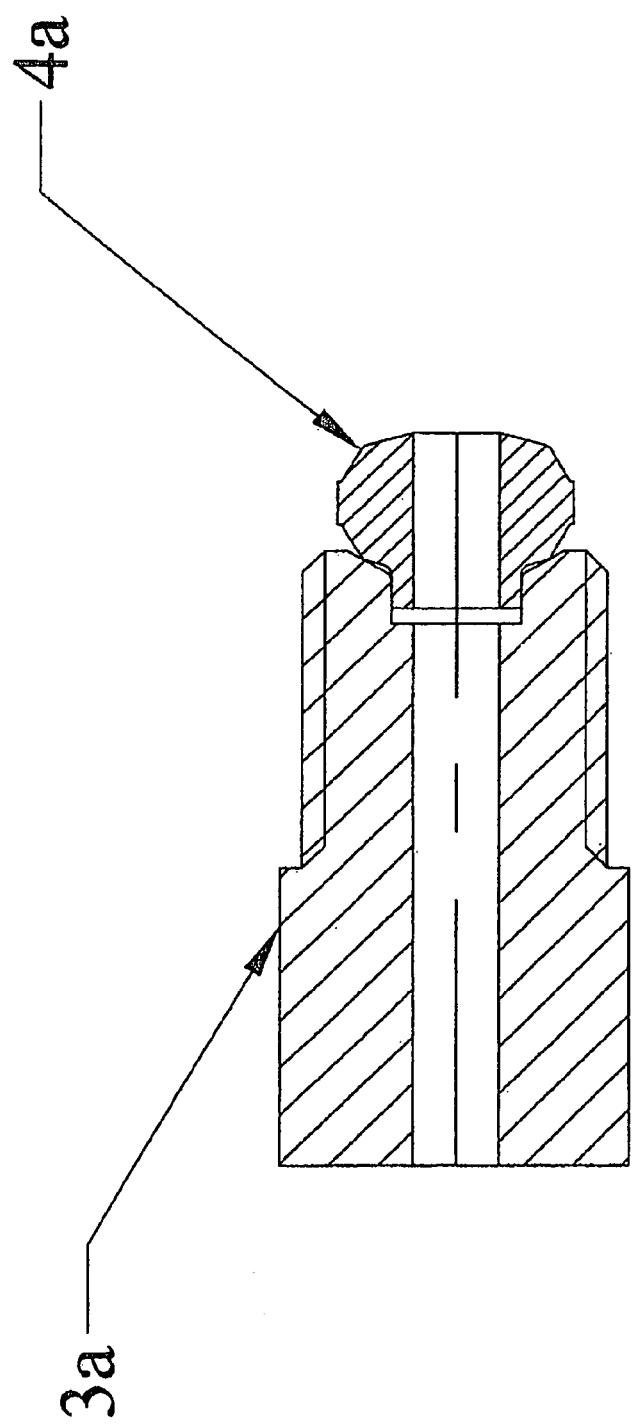
FIGS. 5a and 5b illustrate the insert mounted in the fitting for both options (internal and external fittings)
Figure 5B:
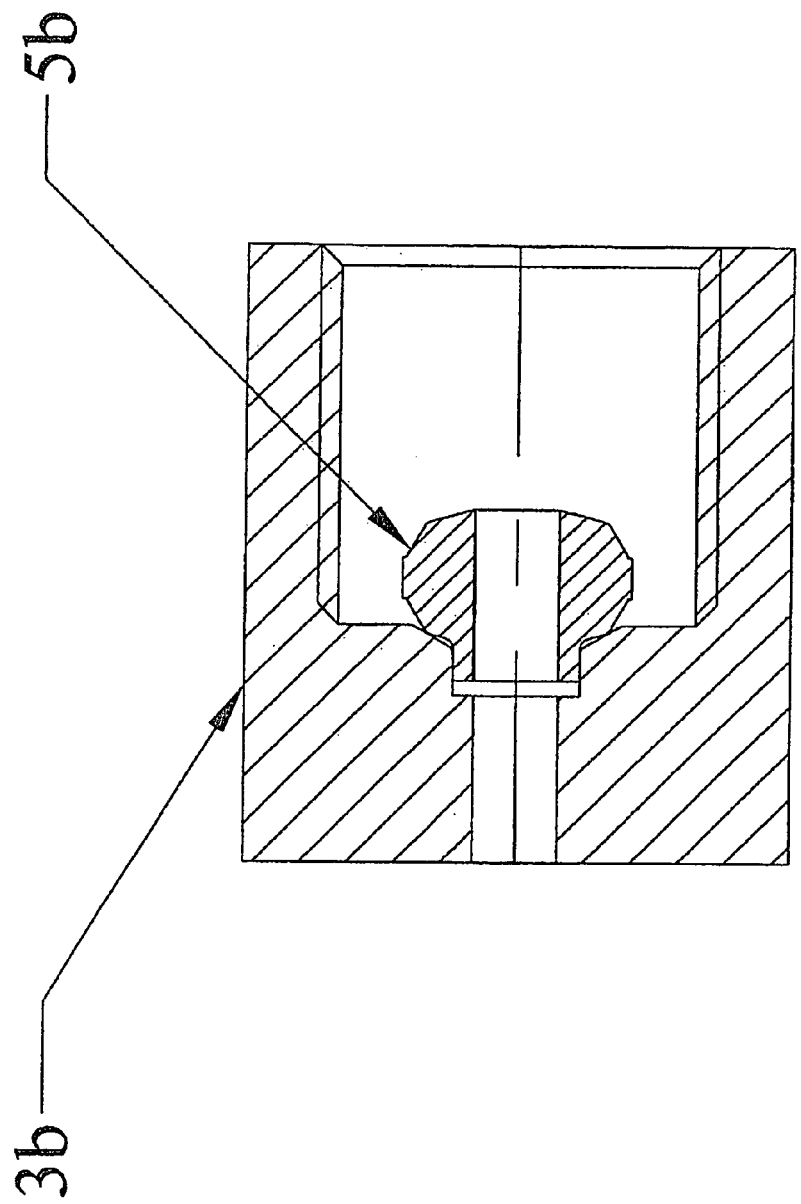

Referring to FIG. 5a and 5b, there is an illustration of the insert pieces (4a) and (5b) mounted in the fitting for internal and external fittings (3a) and (3b), respectively. The male fitting (3a) and the female fitting (3b) each have a cylindrical cavity that corresponds to a cylindrical projection on one end of the insert pieces (4a) and (5b), respectively. Consequently, each insert piece (4a) and (4b) is always properly positioned in the fitting 3a, 3b. Even though not shown in all figures, it is clear that the cylindrical cavity and the cylindrical projection can be added to any other embodiments.

FIG. 6 illustrates different sectional shapes that can be used for the insert piece, such as flat (a), angled (b), multi-angled (c), round (d), curved (e), grooved (f), zigzagged (g) and polygon-grooved (h).

Even though not shown in FIG. 6, it is clear that the different sealing surface shapes can be used individually or in combination on one insert. For example it is possible to combine a flat sealing surface on one end of the insert with a curved sealing surface on the opposite end of the insert.

Referring to FIG. 7a, there is illustrated a preferred design insert piece (4c) inserted between the male fitting (3a) and, at the proximal end of tubing (1a), an enlarged female tube end (5) with a female nut (2a) threadably engaged over the threaded end of male fitting (3a). The insert piece (4c) includes a short tube (11) formed of harder metal than that of the body of the insert piece and extending from one end thereof to form a cylindrical projection which fits into a cylindrical cavity formed into the proximal end face of the female tube end (5). Consequently, the insert piece (4c) is always properly positioned in the female tube end (5). Referring to FIG. 7b, there is an illustration of the preferred insert piece (4c) applied to a female fitting (3b) and the female tube end (5) with a male nut (2b). All of the fittings described hereinabove are made of harder steel having a higher yield strength, for example, in the range of 45,000 psi, while the deformable insert pieces are made of a steel of lower yield strength, for example, in the range of 35,000 psi.

While a number of exemplary aspects and embodiments have been discussed above, those of skill in the art will recognize certain modifications, permeations and additions and subcombinations thereof. It is therefore intended that the following appended claims and claims hereinafter introduced are interpreted to include all such modifications, permeations, additions and subcombinations that are within their true spirit and scope.

The invention claimed is:

1. A high pressure tubing joint comprising:
   a first part of said joint forming an enlarged female end having a high-pressure tube and a female nut positioned over said female end;
   a second part of said joint forming a male end and including a male fitting;
   a replaceable insert piece sealingly engageable being deformed between facing surfaces of said female and male ends when said first and second parts are threadably tightened together;
   said facing surfaces being conically shaped, each surface of said insert which sealingly engages against a corresponding said facing surface having a convex shape;
   said first and second parts and said insert piece being coaxially aligned one to another;
   said insert piece having a cylindrical projection at one end thereof which matingly engages into a cylindrical cavity formed into a proximal end of said female fitting;
   said insert piece being freely removable and replaceable each time said tubing joint is disassembled.

2. The high pressure tubing joint of claim 1, wherein:
   said insert piece includes a central tubular alignment portion matingly engageable coaxially with said female end.

3. The high pressure tubing joint of claim 1, wherein:
   each said convex surface makes a line contact with the corresponding said facing surface.

4. A high pressure tubing joint comprising:
   a first part of said joint forming a male end and including a high-pressure tube and a male nut positioned over a female end of said tube;
   a second part of said joint forming a female end and including a female fitting;
   a deformable replaceable insert piece sealingly engageable being said first and second parts when said first and second parts are threadably tightened together;
   said facing surfaces being conically shaped, each surface of said insert which sealingly engages against a corresponding said facing surface having a convex shape;
   said insert piece being freely removable and replaceable each time said tubing joint is disassembled;
   said first and second parts and said insert piece being coaxial one to another;
   said insert piece having a cylindrical projection at one end thereof which matingly engages into a cylindrical cavity formed into a proximal end of said female fitting.

5. The high pressure tubing joint of claim 4, wherein:
   each said convex surface makes a line contact with the corresponding said facing surface.

6. A high pressure tubing joint comprising:
   a first part of said joint forming a female end including a high-pressure tube and a female nut positioned over said female end;
   a second part of said joint forming a male end and including a male fitting;
   a deformable insert piece sealingly engageable between said first and second parts when said first and second parts are threadably tightened together;
   said facing surfaces being conically shaped, each surface of said insert which sealingly engages against a corresponding said facing surface having a convex shape;
   said parts and said insert piece being coaxial one to another;
   said insert piece having a cylindrical projection at one end thereof which matingly engages into a cylindrical cavity formed into a proximal end of said male fitting.

7. The high pressure tubing joint of claim 6, wherein:
   each said convex surface makes a line contact with the corresponding said facing surface.

* * * * *